(12) United States Patent
Fouquet

(10) Patent No.: US 6,609,455 B2
(45) Date of Patent: Aug. 26, 2003

(54) DEVICE FOR DRIVING A ROTARY TOOL FOR A FOOD-PROCESSING APPARATUS, AND FOOD-PROCESSING APPARATUS PROVIDED WITH SUCH A DEVICE

(75) Inventor: Jacques Fouquet, Lyons (FR)

(73) Assignee: Santos SA, Vaulx-en-Velin (FR)

( * ) Notice: Subject to any disclaimer, the term of this patent is extended or adjusted under 35 U.S.C. 154(b) by 0 days.

(21) Appl. No.: 10/235,960

(22) Filed: Sep. 6, 2002

(65) Prior Publication Data

US 2003/0052206 A1 Mar. 20, 2003

(30) Foreign Application Priority Data

Sep. 14, 2001 (FR) ................................. 0111946

(51) Int. Cl.⁷ .............................. A23N 1/00; A23N 1/02; A47J 43/046; A47J 43/07; A23L 1/00
(52) U.S. Cl. ............................................ 99/511; 99/513
(58) Field of Search .................. 99/492, 495, 509–513; 366/291, 297–300, 314, 601; 241/37.5, 92, 282.1, 282.2; 494/36, 37, 43, 47, 10, 85; 426/61, 63, 49, 52, 533, 599, 640, 231, 233

(56) References Cited

U.S. PATENT DOCUMENTS

| 3,533,563 A | * | 10/1970 | Eriksson | 241/92 X |
| 3,779,522 A | * | 12/1973 | Loomans | 366/601 |
| 4,025,056 A | * | 5/1977 | Miles et al. | 366/197 X |
| 4,073,013 A | * | 2/1978 | Blach | 366/601 |
| 4,078,481 A | | 3/1978 | Wunderlin | |
| 4,506,601 A | * | 3/1985 | Ramirez et al. | 99/513 |
| 4,681,031 A | * | 7/1987 | Austad | 99/511 |
| 4,840,119 A | * | 6/1989 | Caldi | 99/512 |
| 4,924,770 A | * | 5/1990 | Raub | 99/510 |
| 5,031,522 A | * | 7/1991 | Birixel et al. | 99/511 |
| 5,193,448 A | * | 3/1993 | Antonio | 99/512 |
| 5,421,248 A | * | 6/1995 | Hsu | 99/512 |
| 5,433,144 A | * | 7/1995 | Lee | 99/513 |
| 5,495,795 A | * | 3/1996 | Harrison et al. | 99/492 |

FOREIGN PATENT DOCUMENTS

DE 1127044 4/1962

* cited by examiner

Primary Examiner—Timothy F. Simone
(74) Attorney, Agent, or Firm—Dowell & Dowell, P.C.

(57) ABSTRACT

This drive device comprises a rotary shaft (50), integral with a drive head (56), capable of being fitted closely into a base part (30) of the rotary tool (24). This drive head (56) is provided with at least two studs (66), which can move between a radially set-back rest position and a radially separate use position, in which each stud is engaged in the base part (30), and an elastic membrane (76) is provided for protecting these studs (66), elastically returning these studs towards their rest position.

8 Claims, 4 Drawing Sheets

DEVICE FOR DRIVING A ROTARY TOOL FOR A FOOD-PROCESSING APPARATUS, AND FOOD-PROCESSING APPARATUS PROVIDED WITH SUCH A DEVICE

The present invention relates to a device for driving a rotary tool for a food-processing apparatus, and also to a food-processing apparatus equipped with this drive device.

In the sense of the invention, such an apparatus processes the foods placed in it, particularly by means of pressing, cutting, grating or slicing. It applies to all type of foods, be these fruit or vegetables, fish or meat.

This processing apparatus may be used in the hotel or catering trades. By way of non-limiting examples, it may be a juice extractor for fruit and vegetables, a conical citrus-fruit squeezer, a grater disc, or a vegetable-cutting disc.

In the case of a juice extractor, it comprises a fixed plinth to which a rotary basket is removably attached. This basket comprises a base, forming a grater, and also lateral walls extending from this base, these walls constituting a sieve.

A lid is also provided, and in the lid there is a chute allowing the introduction of fruit and vegetables. During operation, the fruit and vegetable are kept in contact with the grater, which is rotating at high speed, by means of the action of a push-device handled by the user.

Under these conditions, the fruit or vegetables are shredded in the vicinity of this grater. The sieve then retains the pulp thus formed, whilst allowing the juice to flow.

This pulp is then evacuated through the effect of centrifugal force towards the upper part of the basket and is then recovered in a pulp reservoir. Furthermore, the liquid juice, having passed through the walls of the sieve, is collected in a juice receptacle.

The basket is rotated by a corresponding drive device. This device comprises, in a known manner, a drive head integral with a shaft moved through the action of an electric motor. This drive head is fixed by being fitted closely in the inner volume of a base part with which the basket is provided.

The invention proposes to produce a food-processing apparatus of the type described above, in which the rotary tool can be reliably secured on the drive head during operation.

The invention also aims to propose a food-processing device in which the rotary tool can be placed on the drive head and can be removed therefrom in a particularly easy manner.

Finally, the invention aims to propose a food-processing apparatus in which the device for driving the rotary tool can be cleaned easily and conveniently.

To this end, a subject of the invention is a device for driving, in rotation, a rotary tool for a food-processing apparatus, particularly a basket of a fruit and vegetable juice extractor, it being possible for this tool to be fixed removably onto a plinth of the processing apparatus, this device comprising a rotary shaft integral with a drive head, capable of being fitted closely into a base part of the tool, characterized in that this drive head is provided with at least two studs, which can move between a radially set-back rest position and a radially separate use position, in which each stud is engaged in the base part, and in that an elastic membrane is provided for protecting these studs, elastically returning these studs towards their rest position.

A further subject of the invention is a food-processing apparatus, particularly a juice extractor for fruit and vegetables, comprising a plinth, a rotary tool, particularly a basket, fixed removably on this plinth, and also a device for driving this tool in rotation, characterized in that this drive device is as defined above.

The invention will be described below with reference to the appended drawings, given solely by way of non-limiting example, in which.

Figure 1:
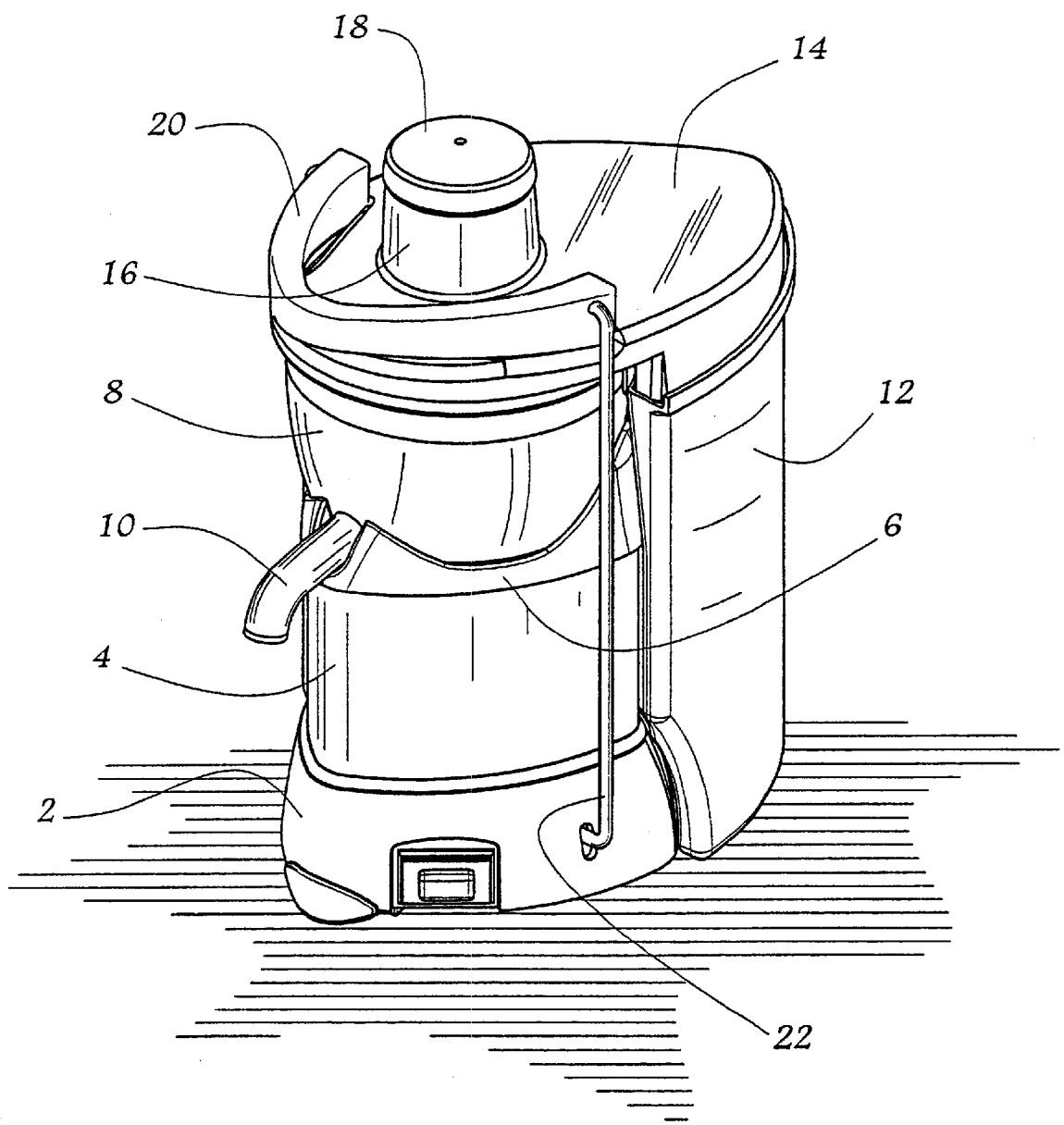
FIG. 1 is a perspective view diagrammatically illustrating a juice extractor for fruit and vegetables according to the invention.

FIG. 1 diagrammatically illustrates a food-processing apparatus that is a juice extractor for fruit and vegetables. Conventionally, it includes a plinth 2 supporting a column 4 on which a centring element 6 is arranged, allowing a juice receptacle 8 provided with a pouring spout 10 to be received.

Also provided is a pulp reservoir 12 placed opposite the pouring spout 10. This receptacle and this reservoir are surmounted by a lid 14 in which a chute 16 for inserting fruit and vegetables is provided.

A push device 18, for keeping the fruit and vegetables in contact with a grater of the juice extractor, visible in the subsequent figures, is free to slide in the chute 16. A gripping handle 20 is provided, mounted on a gripping rod 22 articulated on the plinth, which removably fixes the lid 14 on the receptacle 8 and the reservoir 12.

Figure 2:
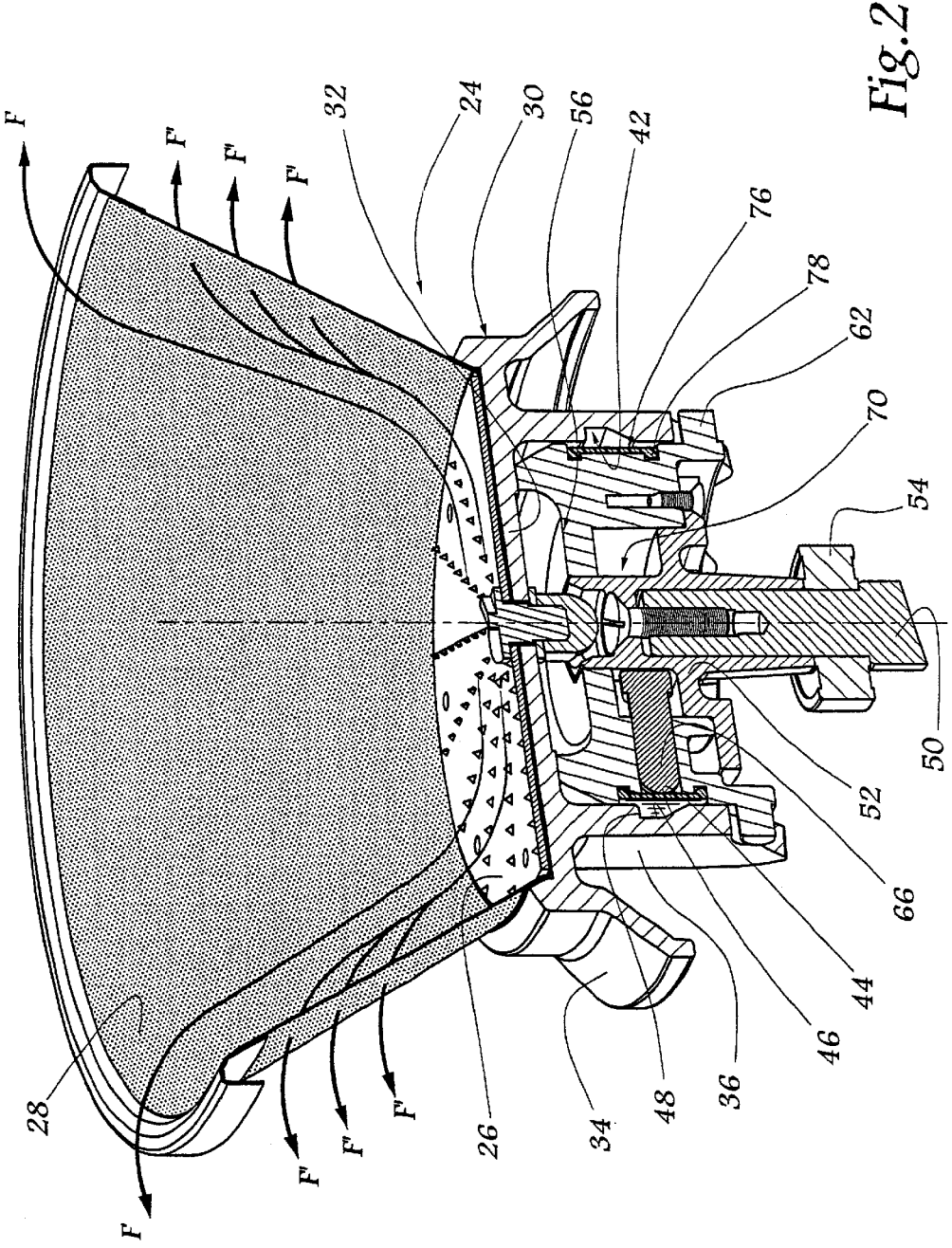
FIG. 2 is a perspective view, with cutaways, illustrating the basket of the juice extractor in FIG. 1 and also its rotary drive device.

The juice extractor also includes a rotary tool, namely a basket received in the inner volume of the receptacle 8, which is, in particular, visible in FIG. 2. This basket, denoted overall by the reference 24, has a base 26, forming a grater, the upper surface of which is provided with spikes.

Lateral walls 28 of the basket, which form a sieve, extend from this base 26. During operation, the fruit and vegetables are received in contact with the grater, via the chute 16, and are then shredded by the spikes on this grater.

The pulp thus formed is retained by the walls of the sieve 28 and evacuated to the upper part of the sieve, towards the reservoir 12 (arrows F). Conversely, the liquid juice passes through the walls of the sieve (arrows F'), to be collected in the juice receptacle 8.

The basket 24 is also provided with a base part 30 that comprises an upper wall 32 in contact with the base 26, a peripheral collar 34 and also an axial skirt 36 extending opposite the sieve 28.

Furthermore, the inner wall of this skirt 36 is hollowed out with a peripheral reinforcement 42. This reinforcement is delimited, from bottom to top, by a frustoconical wall 44 that narrows towards the top, then by a cylindrical wall 46 and, finally, by an upper shoulder 48. In this way, this reinforcement flares upwards, i.e. its transverse dimensions increase towards the top.

Figure 3:
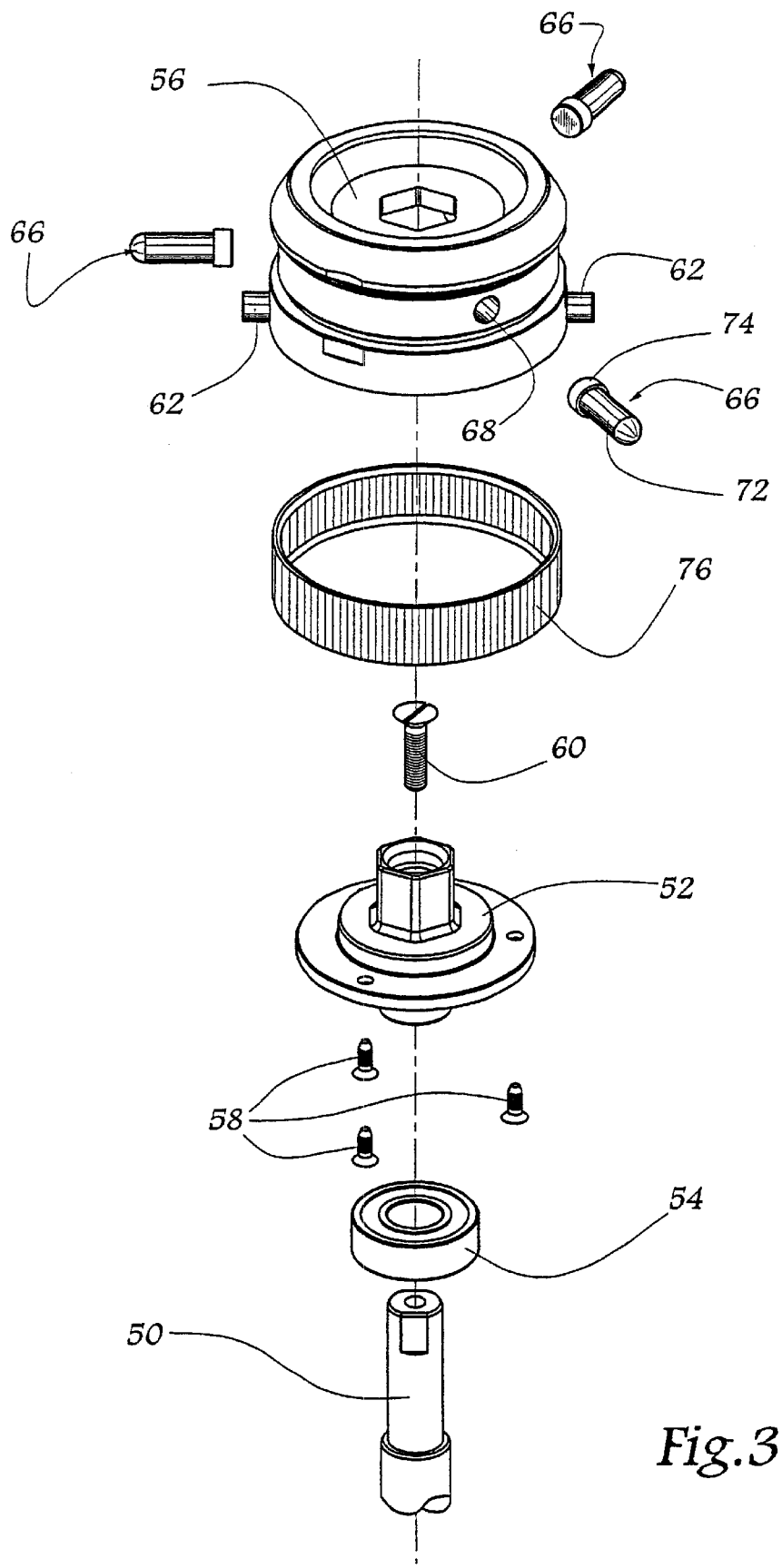
FIG. 3 is an exploded perspective view illustrating the various component elements of the drive device in FIG. 2.

The basket 24 is mounted on a device allowing it to be driven in rotation, which is illustrated more precisely in FIG. 3.

This drive device comprises a vertical shaft 50 moved by an electric motor (not shown), and also a hub 52 placed on the shaft 50, with interposition of a bearing 54. A cylindrical head 56 is provided, which is fixed, firstly, on the hub by means of three radial screws 58, and, secondly, on the shaft 50 by means of a central screw 60. This head is equipped with two diametrically opposed fingers 62 intended to be received in the housings 40 in the skirt 36.

The head 56 is hollowed out with three housings, each one of which receives a corresponding stud 66. More precisely, each housing comprises an emergent radial bore 68 that communicates with a central chamber 70 that has greater transverse dimensions.

Furthermore, each stud 66 has a cylindrical peg 72, received in the bore, and also a head 74 of greater diameter, received in the chamber 70 with the possibility of radial clearance.

The periphery of the cylindrical head 56 is surrounded by an annular membrane 76, produced from a flexible elastomeric material. This membrane is provided with two inner lips 78 that are received in two peripheral grooves 80 provided in the outer surface of the head 56.

It should be noted that, owing to its elasticity, this membrane 76 returns the studs 66 towards their withdrawn position illustrated, in particular, in FIG. 2. In this position, the free end of the head 74 of each stud is pushed back against the central wall of a corresponding chamber 70.

The operation of the basket 24 and also of its rotary drive device will now be explained below.

Firstly, it involves mounting this basket 24 around the drive head 56. This operation may be achieved solely by means of taking advantage of gravity: given the profile of the notches 38, the skirt 36 of the base part descends spontaneously, relative to the head 56, until the fingers 62 are received in the corresponding housings 40.

It should be noted that this mounting operation is particularly simple, in so far as it is not impeded by the studs 66, which are in their withdrawn position, as mentioned above.

Figure 4:
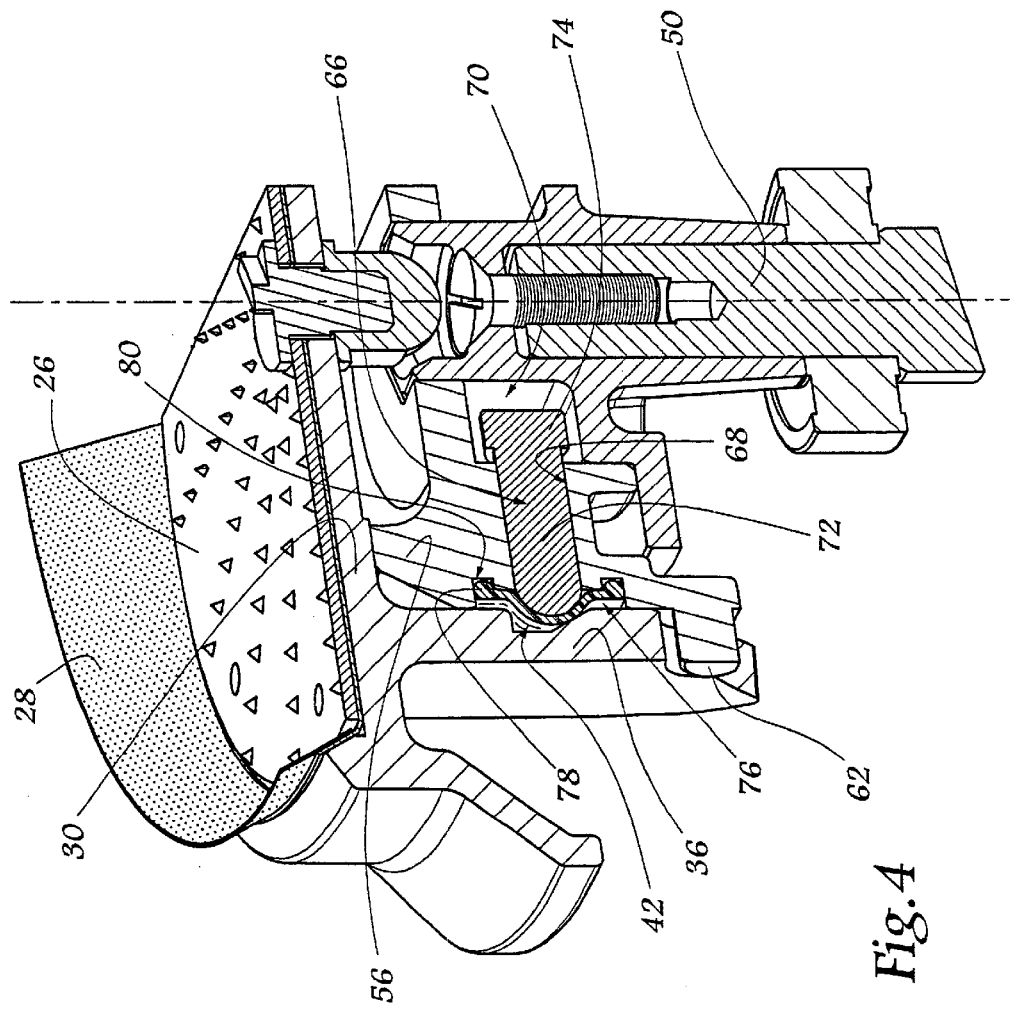
FIG. 4 is a perspective view similar to FIG. 2, on a larger scale, illustrating the configuration, during operation, of the drive device in FIGS. 2 and 3.

Next, when the shaft 50 is driven in rotation by its motor (not shown), the three fingers 6 separate through the effect of centrifugal force as illustrated in FIG. 4.

Under these conditions, the head 74 of each stud bears against the outer wall of a corresponding chamber 70. Furthermore, the free end of the peg 72 comes to be housed in the reinforcement 42, with the interposition of the membrane 76, which is deformed elastically.

The force exerted by the membrane 76 on the frustoconical inner wall of the skirt 36 generates a vertical force, directed downwards, which gives rise to the locking of the basket 24 on the head 56.

When the electric motor stops, the speed of rotation of the drive head 56 progressively drops, so that each stud 66 moves from its separate position, illustrated using FIG. 4, towards its withdrawn position, shown in FIGS. 2 and 3. Removal of the basket can then take place in a particularly easy manner, given that this action is not impeded by the studs 66.

The invention is not limited to the example described and shown.

Thus, the drive device in FIGS. 2 to 4 can be fitted to food-processing apparatuses other than a juice extractor. In this connection, reference will be made to the definition given, in the sense of the invention, at the beginning of this description.

The invention makes it possible to achieve the objectives mentioned above.

Indeed, the presence of radially movable studs firmly presses the tool, when the latter is rotating, onto its drive device.

In this way, this tool is reliably secured onto the drive head, which rules out any inopportune separation. Furthermore, this reduces vibration phenomena, which makes the food-processing apparatus of the invention particularly silent.

Moreover, given that the studs are in their set-back position, in the absence of rotation of the drive head the operations consisting in placing the tool on the drive head and in removing it therefrom prove to be particularly simple to carry out.

Finally, using a membrane for the elastic return of the studs provides a supplementary function of mechanically protecting these studs. In this way, these studs are subjected only to a small degree to soiling phenomena, which allows simple, rapid cleaning of the drive device.

I claim:

1. Device for driving, in rotation, a rotary tool for a food-processing apparatus, particularly a basket (24) of a fruit and vegetable juice extractor, it being possible for this tool (24) to be fixed removably onto a plinth (2) of the processing apparatus, this device comprising a rotary shaft (50) integral with a drive head (56), capable of being fitted closely into a base part (30) of the tool (24), characterized in that this drive head (56) is provided with at least two studs (66), which can move between a radially set-back rest position (FIG. 2) and a radially separate use position (FIG. 4), in which each stud is engaged in the base part (30), and in that an elastic membrane (76) is provided for protecting these studs (66), elastically returning these studs towards their rest position.

2. Device according to claim 1, characterized in that, during operation, each stud (66) penetrates, with interposition of the membrane (76), into a reinforcement (42) provided in a wall opposite the base part (30).

3. Device according to claim 2, characterized in that this reinforcement (42) flares upwards.

4. Device according to claim 1, characterized in that the elastic membrane (76) is fixed removably on the outer periphery of the drive head (56).

5. Device according to claim 4, characterized in that the elastic membrane (76) is provided with at least one inner lip (78) that can be received in at least one peripheral groove (80) provided in the drive head (56).

6. Device according to claim 1, characterized in that each stud includes a peg (72) received in an emergent bore (68) provided in the drive head (56), and also a head (74), of larger transverse dimension than the peg (72), received in a chamber (70) with the possibility of radial clearance.

7. Device according to claim 1, characterized in that the drive head (56) is provided with three studs (66) arranged angularly at 120°.

8. Food-processing apparatus, particularly a juice extractor for fruit and vegetables, including a plinth (2), a rotary tool (24), in particular a basket, fixed removably on this plinth, and also a device (50, 56) for driving this tool in rotation, characterized in that this drive device is in accordance with claim 1.

* * * * *